United States Patent Office 3,169,962
Patented Feb. 16, 1965

3,169,962
BENZHYDRYL ETHERS OF 10-(HYDROXYETHYL-PIPERAZINOPROPYL) PHENOTHIAZINES
Harry Louis Yale and Jack Bernstein, New Brunswick, and Francis Alexander Sowinski, Nixon, N.J., assignors to Olin Mathieson Chemical Corporation, New York, N.Y., a corporation of Virginia
No Drawing. Filed Feb. 28, 1963, Ser. No. 261,880
6 Claims. (Cl. 260—243)

This invention relates to new ethers of phenothiazines having valuable therapeutic properties and processes for the preparation thereof.

The new therapeutitcally active compounds of this invention include phenothiazines of the general formula:

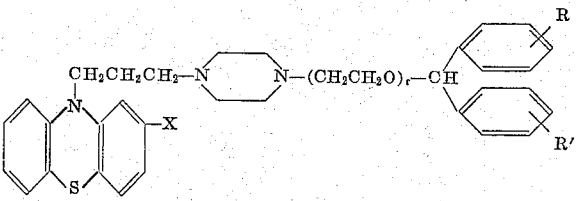

and non-toxic acid-addition salts thereof; wherein $r$ is one or two; and X, R and R' are the same or different and each represents hydrogen, halogen (preferably chloro), trifluoromethyl, lower alkyl, lower alkoxy, lower alkanoyl, lower alkyl mercapto, trifluoromethylmercapto, trifluoromethoxy, lower alkylsulfonyl (preferably methylsulfonyl) and N,N-dimethylaminosulfonyl.

The preferred compounds are those wherein $r$ is one, R and R' are hydrogen and X is chloro or trifluoromethyl.

As the salts of the bases of this invention, those coming within the purview of the invention include the acid-addition salts, particularly, the non-toxic acid, addition salts. Acids useful for preparing the acid-addition salts, include, interalia, inorganic acids, such as the hydrohalic acids (e.g., hydrochloric and hydrobromic acid), sulfuric acid, nitric acid and phosphoric acid, and organic acids, such as oxalic, maleic, fumaric, tartaric, citric, acetic, succinic and pamoic acid.

The compounds of this invention are therapeutically active compounds which are utilizable both as tranquilizing (ataractic) agents, and thus may be used in the treatment of depressed psychotic states, and as antihistamines. For these purposes they may be administered orally or parenterally in conventional dosage forms such as tablets, capsules, injectables or the like by incorporating the appropriate dose of the compound with carriers according to accepted pharmaceutical practices. The compounds of this invention are superior to known phenothiazine tranquilizing agents in that they possess an antagonism to the extrapyramidal syndome, a side-effect frequently associated with therapy by these agents.

The compounds of this invention can be prepared by interacting a compound of the general Formula I:

(I) 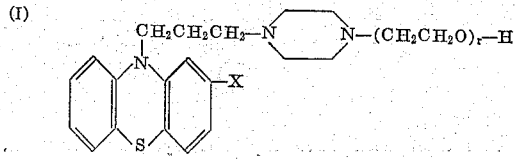

wherein X and $r$ are as hereinbefore defined, with a diphenylmethyl halide (preferably chloride) of the formula:

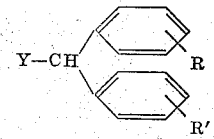

wherein Y is halo and R and R' are as hereinbefore defined, the reaction preferably being conducted in an organic solvent, such as toluene and tetrahydrofuran, for the reactants in the presence of a basic compound, such as sodium hydride.

Among the suitable phenothiazine reactants may be mentioned:

10-[3-(2-hydroxyethyl)piperazinopropyl]phenothiazine;
10-[3-(2-hydroxyethyl)piperazinopropyl]-2-halo-phenothiazines, such as
10-[3-(2-hydroxyethyl)piperazinopropyl]-2-chlorophenothiazine;
10-[3-(2-hydroxyethyl(piperazinopropyl]-2-trifluoromethylphenothiazine;
10-[3-(2-hydroxyethoxyethyl)piperazinopropyl]-2-halo-phenothiazines, such as
10-[3-(2-hydroxyethoxyethyl)piperazinopropyl]-2-chlorophenothiazine;
10-[3-(2-hydroxyethoxyethyl)piperazinopropyl]-2-trifluoromethylphenothiazine;
10-[3-(2-hydroxyethyl)piperazinopropyl]-2-(lower alkyl)-phenothiazines, such as
10-[3-(2-hydroxyethyl)piperazinopropyl]-2-methylphenothiazine;
10-[3-(2-hydroxyethyl)piperazinopropyl]-2-(lower alkoxy)phenothiazines, such as
10-[3-(2-hydroxyethyl)piperazinopropyl]-2-methoxyphenothiazine;
10-[3-(2-hydroxyethyl)piperazinopropyl]-2-(lower alkanoyl)phenothiazines, such as
10-[3-(2-hydroxyethyl)piperazinopropyl]-2-propionylphenothiazine;
10[3-(2-hydroxyethyl)piperazinopropyl]-2-(lower alkyl mercapto)phenothiazines, such as
10-[3-(2-hydroxyethyl)piperazinopropyl]-2-methylmercaptophenothiazine;
10-[3-(2-hydroxyethyl)piperazinopropyl]-2-trifluoromethylmercaptophenothiazine;
10-[3-(2-hydroxyethyl)piperazinopropyl]-2-trifluoromethoxyphenothiazine;
10-[3-(2-hydroxyethyl)piperazinopropyl]-2-methylsulfonylphenothiazine and
10-[3-(2-hydroxyethyl)piperazinopropyl]-2-N,N-dimethylaminosulfonylphenothiazine.

Among the suitable diphenylmethyl chloride reactants may be mentioned:

benzhydryl chloride;
α-(halophenyl)benzyl chlorides, such as
α-(o-bromophenyl)benzyl chloride,
α-(p-chlorophenyl)benzyl chloride and
α-(m-fluorophenyl)benzyl chloride;
α-[(trifluoromethyl)phenyl]benzyl chlorides, such as
α-[(p-trifluoromethyl)phenyl]benzyl chloride and
α-[(o-trifluoromethyl)phenyl]benzyl chloride;

α-(lower alkyl-phenyl)benzyl chlorides, such as
α-(p-tolyl)benzyl chloride,
α-(p-ethylphenyl)benzyl chloride, and
α-(m-isopropylphenyl)benzyl chloride;
α-(lower alkoxyphenyl)benzyl chlorides, such as
α-(p-methoxyphenyl)benzyl chloride;
α-(lower alkyl mercaptophenyl)benzyl chlorides, such as
α-(p-methylmercaptophenyl)benzyl chloride and
α-(o-ethylmercaptophenyl)benzyl chloride;
α-[(2-trifluoromethoxy)phenyl]benzyl chlorides, such as
α-[(p-trifluoromethoxy)phenyl]benzyl chloride;
α-(N,N-dimethylaminosulfonylphenyl)benzyl chlorides, such as
α-(p-N,N-dimethylaminosulfonylphenyl)benzyl chloride;
α-(lower alkylsulfonylphenyl)benzyl chlorides, such as
α-(p-methylsulfonylphenyl)benzyl chloride;
α,α-di(halophenyl)methyl chlorides, such as
α,α-di(p-chlorophenyl)methyl chloride and
α-(p-chlorophenyl)-α-(p-bromophenyl)methyl chloride;
α-halophenyl-α-(lower alkyl phenyl)methyl chlorides, such as
α-(p-chlorophenyl)-α-(p-tolyl)methyl chloride;
α,α-di(lower alkyl phenyl)methyl chlorides, such as
α,α-di(p-tolyl)methyl chloride; and
α-(lower alkoxyphenyl)-α-(halophenyl)methyl chlorides.

The substituted benzyl chlorides are prepared by known methods. Thus, as a typical procedure, p-trifluoromethoxybenzoic acid (prepared by the sequence: ethyl p-hydroxybenzoate→ethyl p-trichloromethoxybenzoate→ethyl p - trifluoromethoxybenzoate p - trifluoromethoxybenzoic acid→p - trifluoromethoxybenzoyl chloride→p - trifluoromethoxyphenyl phenyl ketone→α(p - trifluoromethoxyphenyl)benzyl chloride.

Alternatively, the compounds of this invention can be prepared by interacting a compound of the general Formula II:

(II)

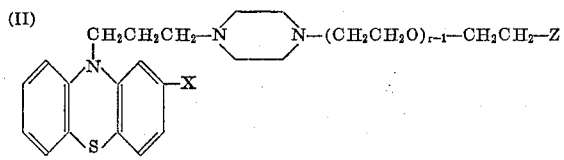

wherein X and r are as hereinbefore defined and Z is halogen, preferably chlorine or bromine, with diphenyl carbinol of the formula:

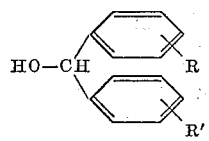

wherein R and R' are as hereinbefore defined, in the presence of a condensing agent such as sodium hydride, in an organic solvent, such as toluene and tetrahydrofuran. The compounds of Formula II can be prepared as disclosed in application Serial No. 254,459, filed January 28, 1963, and application Serial No. 261,866, filed February 28, 1963, by interacting a compound of Formula I with a thionyl halide, such as thionyl chloride and thionyl bromide.

Among the suitable phenothiazine reactants of the Formula II may be mentioned:

10-[3-(2-chloroethyl)piperazinopropyl]phenothiazine;
10-[3-(2-bromoethyl)piperazinopropyl]-2-halophenothiazines, such as
10-[3-(2-bromoethyl)piperazinopropyl]-2-chlorophenothiazine;
10-[3-(2-bromoethyl)piperazinopropyl]-2-trifluoromethyl) phenothiazine;
10-[3-(2-chloroethoxyethyl)piperazinopropyl]-2-halophenothiazines, such as
10-[3-(2-chloroethoxyethyl)piperazinopropyl]-2-chlorophenothiazine;
10-[3-(2-chloroethoxyethyl)piperazinopropyl]-2-(trifluoromethyl)-phenothiazine;
10-[3-(2-chloroethyl)piperazinopropyl]-2-(lower alkyl)-phenothiazines, such as
10-[3-(2-chloroethyl)piperazinopropyl]-2-methylphenothiazine;
10-[3-(2-chloroethyl)piperazinopropyl]-2-(lower alkoxy)phenothiazines, such as
10-[3-(2-chloroethyl)piperazinopropyl]-2-methoxyphenothiazine;
10-[3-(2-chloroethyl)piperazinopropyl]-2-(lower alkanoyl)phenothiazines, such as
10-[3-(2-chloroethyl)piperazinopropyl]-2-propionylphenothiazine;
10-[3-(2-chloroethyl)piperazinopropyl]-2-(lower alkyl mercapto)phenothiazines, such as
10-[3-(2-chloroethyl)piperazinopropyl]-2-methylmercaptophenothiazine;
10-[3-(2-chloroethyl)piperazinopropyl]-2-trifluoromethylmercaptophenothiazine;
10-[3-(2-chloroethyl)piperazinopropyl]-2-trifluoromethoxyphenothiazine;
10-[3-(2-chloroethyl)piperazinopropyl]-2-methylsulfonylphenothiazine and
10-[3-(2-chloroethyl)piperazinopropyl]-2-N,N-dimethylaminosulfonylphenothiazine.

The compounds of this invention can also be prepared by interacting a compound of the general Formula III:

(III)

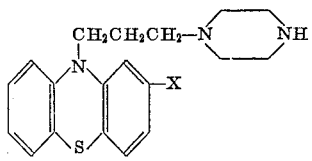

wherein X is as hereinbefore defined with a compound of the general Formula IV:

(IV)

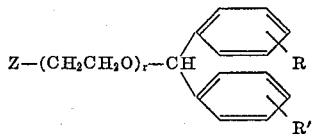

wherein Z, r, R and R' are as hereinbefore defined, in an organic solvent, such as benzene, toluene, methyl ethyl ketone or tetrahydrofuran, in the presence of a basic compound, such as barium hydroxide. Compounds IV can be prepared by the interaction first of a benzhydrol with sodium hydride, reaction of the sodium salt formed with chloroethanol or chloroethyl hydroxyethyl ether to give a 2-benzhydryloxyethanol or 2-benzhydryloxyethyl hydroxyethyl ether and interaction of the last mentioned compounds with thionyl chloride.

The free bases of this invention can be converted to acid-addition salts by treatment with the desired acid. This reaction is preferably conducted in an inert organic solvent under substantially anhydrous conditions by treating the base with the acid, whereby the acid-addition salt is formed.

The following examples illustrate the invention (all temperatures being in centigrade):

*Example 1.—4-{3-[2-(trifluoromethyl)phenothiazin-10-yl]propyl}-piperazinoethyl benzhydryl ether*

(a) *Preparation of 4-{3-[2-(trifluoromethyl)phenothiazin-10-yl]-propyl}-piperazinoethyl 2-dimethylaminoethyl ether, hydrochloride salt.*—To 32.8 g. of 4-{3-[2-(trifluoromethyl)phenothiazin - 10 - yl] - propyl}piperazinoethanol in 125 ml. of dry toluene is added slowly 3.55 g. of a 50% dispersion of sodium hydride in mineral oil. Following the vigorous reaction, the mixture is refluxed for an hour, cooled and treated with 15.0 g. of benzhydryl chloride. Subsequently, the mixture is heated at 85° for 16 hours, cooled and filtered. The filtrate is washed with water and then with 10% aqueous hydrochloric acid.

The hydrochloric acid extracts obtained in step *a* are cooled, an excess of 40% aqueous potassium hydroxide is added and the liberated oil extracted into ether. The ether extracts are concentrated to give 4-{3-[2-(trifluoromethyl)phenothiazin-10-yl]propyl}piperazinoethyl benzhydryl ether as a pale yellow oil.

*Example 2.—4-[3-(2-chlorophenothiazin-10-yl)propyl]-piperazinoethyl benzhydryl ether*

Following the procedure of Example 1 but substituting an equivalent amount of 4-[3-(2-chlorophenothiazin-10-yl)propyl]piperazinoethanol for the piperazinoethanol used in the example, 4-[3-(2-chlorophenothiazin-10-yl)-propyl]piperazinoethyl benzhydryl ether is formed.

*Example 3.—4-[3-(phenothiazin-10-yl)propyl] piperazinoethyl benzhydryl ether*

Following the procedure of Example 1 but substituting an equivalent amount of 4-[3-(phenothiazin-10-yl)propyl]piperazinoethanol for the piperazinoethanol used in the example, 4-[3-(phenothiazin-10-yl)propyl]piperazinoethyl benzhydryl ether is formed.

In a similar manner by substituting the indicated 2-substituted phenothiazine for the piperazinoethanol used in Example 1 and following the procedure of the example, the indicated 2-substituted phenothiazine ether is formed:

| Example | Starting Material | Product Formed: Benzhydryl Ether of— |
|---|---|---|
| 4 | 4-[3-(2-Methylphenothiazin-10-yl)propyl]piperazinoethanol. | 4-[3-(2-Methylphenothiazin-10-yl)propyl]piperazinoethyl. |
| 5 | 4-[3-(2-Methoxyphenothiazin-10-yl)propyl]piperazinoethanol. | 4-[3-(2-Methoxyphenothiazin-10-yl)propyl]piperazinoethyl. |
| 6 | 4-[3-(2-Propionylphenothiazin-10-yl)propyl]piperazinoethanol. | 4-[3-(2-Propionylphenothiazin-10-yl)propyl]piperazinoethyl. |
| 7 | 4-{3-[2-(Methylmercapto)phenothiazin-10-yl]propyl}piperazinoethanol. | 4-{3-[2-(Methylmercapto)phenothiazin-10-yl]propyl}piperazinoethyl. |
| 8 | 4-{3-[2-(Trifluoromethylmercapto)phenothiazin-10-yl]propyl}piperazinoethanol. | 4-{3-[2-(Trifluoromethylmercapto)phenothiazin-10-yl]propyl}piperazinoethyl. |
| 9 | 4-{3-[2-(Trifluoromethoxy)phenothiazin-10-yl]propyl}piperazinoethanol. | 4-{3-[2-(Trifluoromethoxy)phenothiazin-10-yl]propyl}piperazinoethyl. |
| 10 | 4-{3-[2-(Methylsulfonyl)phenothiazin-10-yl]propyl}piperazinoethanol. | 4-{3-[2-(Methylsulfonyl)phenothiazin-10-yl]propyl}piperazinoethyl. |
| 11 | 4-{3-[2-(N,N-Dimethylaminosulfonyl)phenothiazin-10-yl]propyl}piperazinoethanol. | 4-{3-[2-(N,N-Dimethylaminosulfonyl)phenothiazin-10-yl]propyl}piperazinoethyl. |

*Example 12.—4-{3-[2-(trifluoromethyl)phenothiazin-10-yl]propyl}-piperazinoethoxyethyl benzhydryl ether*

Following the procedure of Example 1 but substituting an equivalent amount of 4-{3-[2-(trifluoromethyl)phenothiazin - 10 - yl]propyl}-piperazinoethoxyethanol for the piperazinoethanol used in the example, 4-{3-[2-(trifluoromethyl)phenothiazin - 10 - yl]propyl} - piperazinoethoxyethyl benzhydryl ether is formed.

*Example 13.—4 - {3 - [2-(trifluoromethyl)phenothiazin-10 - yl]propyl} - piperazinoethyl benzhydryl ether, dimaleate salt*

To 6.03 g. of the pale yellow oil obtained in Example 1 in 25 ml. of warm acetonitrile is added a solution of 3.32 g. of maleic acid in 25 ml. of warm acetonitrile, with vigorous mixing. The clear solution which forms is allowed to cool slowly. The crystalline solid which separates is filtered and recrystallized from isopropanol to give 4-{3-[2-(trifluoromethyl)phenothiazin-10-yl]propyl}-piperazinoethyl benzhydryl ether, dimaleate salt.

*Example 14.—4-{3-[2-(trifluoromethyl)phenothiazin-10-yl]propyl}-piperazinoethyl-α-(chlorophenyl)benzyl ether*

Following the procedure of Example 1 but substituting an equivalent amount of α-(p-chlorophenyl)benzyl chloride for the benzhydryl chloride, 4-{3-[2-(trifluoromethyl)phenothiazin-10-yl]propyl}-piperazinoethyl α-(p-chlorophenyl)benzyl ether is obtained.

*Example 15.—4-{3-[2-(trifluoromethyl)phenothiazin-10-yl]propyl}-piperazinoethyl α-(p-tolyl)benzyl ether*

Following the procedure of Example 1 but substituting an equivalent amount of α-(p-tolyl)benzyl chloride for the benzhydryl chloride, 4-{3-[2-trifluoromethyl)phenothiazin-10-yl]propyl} - piperazinoethyl α(p - tolyl)-benzyl ether is obtained.

*Example 16.—4-{3 - [2-(trifluoromethyl)phenothiazin-10-yl]propyl}-piperazinoethyl α-(p-methoxyphenyl)benzyl ether*

Following the procedure of Example 1 but substituting an equivalent amount of α-(p-methoxyphenyl)benzyl chloride for the benzhydryl chloride, there is obtained 4-{-3[2-trifluoromethyl)phenothiazin-10 - yl]propyl} - piperazinoethyl α(p-methoxyphenyl)- benzyl ether.

In a similar manner, by substituting the indicated chloride for the benzhydryl chloride in the procedure of Example 1, the indicated ether of 4-{3-[2-(trifluoromethyl)phenothiazin - 10 - yl]propyl} - piperazinoethyl is obtained:

| Example | Starting Material | Ether Formed |
|---|---|---|
| 17 | α-(p-Trifluoromethylphenyl)benzyl chloride. | α-(p-Trifluoromethylphenyl)benzyl. |
| 18 | α-(p-Methylmercaptophenyl)benzyl chloride. | α-(p-Methylmercaptophenyl)benzyl. |
| 19 | α-(p-Trifluoromethoxyphenyl)benzyl chloride. | α-(p-Trifluoromethoxyphenyl)benzyl. |
| 20 | α-(p-N,N-dimethylaminosulfonylphenyl)-benzyl chloride. | α-(p-N,N-dimethylaminosulfonylphenyl)-benzyl. |
| 21 | α-(p-Methylsulfonylphenyl)benzyl chloride. | α-(p-Methylsulfonylphenyl)benzyl. |
| 22 | α,α-di(p-Chlorophenyl)-methyl chloride. | α,α-di(p-Chlorophenyl)-methyl. |
| 23 | α-(p-Chlorophenyl)-α-(p-tolyl)-methyl chloride. | α-(p-Chlorophenyl)-α-(p-tolyl)methyl. |
| 24 | α,α-di(p-Tolyl)methyl chloride. | α,α-di(p-Tolyl)methyl. |

This invention may be variously otherwise embodied within the scope of the appended claims.

What is claimed is:

1. A compound selected from the group consisting of bases of the formula

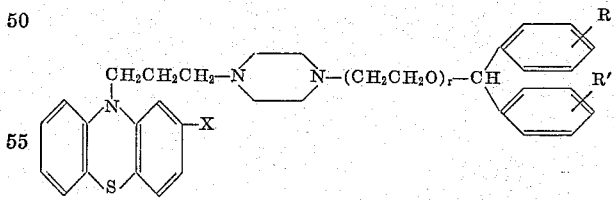

wherein *r* is a positive integer less than three, and X, R and R' are each selected from the group consisting of hydrogen, halogen, trifluoromethyl, lower alkyl, lower alkoxy, lower alkanoyl, lower alkylmercapto, trifluoromethylmercapto, trifluoromethoxy, N,N-dimethylaminosulfonyl and lower alkylsulfonyl; and non-toxic acid-addition salts thereof.

2. 4-{3-[2-(trifluoromethyl)phenothiazin - 10 - yl]propyl}-piperazinoethyl benzhydryl ether.

3. 4-[3-(2 - chlorophenothiazin - 10 - yl)propyl]piperazinoethyl benzhydryl ether.

4. 4-{3-[2-(trifluoromethyl)phenothiazin - 10 - yl]propyl}-piperazinoethoxyethyl benzhydryl ether.

5. A non-toxic acid-addition salt of 4-{3-[2-trifluoromethyl)phenothiazin-10-yl]propyl}-piperazinoethyl benzhydryl ether.

6. 4-{3-[2-(trifluoromethyl)phenothiazin-10-yl]propyl}-piperazinoethyl α(chlorophenyl)benzyl ether.

References Cited by the Examiner

UNITED STATES PATENTS

| | | | |
|---|---|---|---|
| 2,928,767 | 3/60 | Gulesich et al. | 260—243 |
| 2,953,568 | 9/60 | Werner | 260—268 |
| 3,054,791 | 9/62 | Yale et al. | 260—243 |

FOREIGN PATENTS

| | | |
|---|---|---|
| 831,920 | 4/60 | Great Britain. |
| 833,474 | 4/60 | Great Britain. |

IRVING MARCUS, *Primary Examiner.*

JOHN D. RANDOLPH, WALTER A. MODANCE,
*Examiners.*